US005119110A

United States Patent [19]

Arauchi et al.

[11] Patent Number: 5,119,110

[45] Date of Patent: Jun. 2, 1992

[54] HEAD FOR IMAGE PRINTING APPARATUS

[75] Inventors: Ryuji Arauchi; Toshikazu Tomita, both of Ibaraki; Yasuji Endoh, Chiba, all of Japan

[73] Assignee: Komori Corporation, Tokyo, Japan

[21] Appl. No.: 701,571

[22] Filed: May 14, 1991

Related U.S. Application Data

[63] Continuation of Ser. No. 503,251, Apr. 2, 1990, abandoned.

[30] Foreign Application Priority Data

Apr. 18, 1989 [JP] Japan .................................. 1-96355

[51] Int. Cl.[5] .......................................... G01D 15/18

[52] U.S. Cl. ................................ 346/75; 346/140 R

[58] Field of Search ............................ 346/140 R, 75

[56] References Cited

U.S. PATENT DOCUMENTS

| | | | |
|---|---|---|---|
| 4,106,032 | 8/1978 | Miura et al. | 346/140 R |
| 4,628,330 | 12/1986 | Suga et al. | 346/75 |
| 4,665,409 | 5/1987 | Behrens et al. | 346/140 R |
| 4,672,397 | 6/1987 | Suga et al. | 346/140 |
| 4,723,131 | 2/1988 | Droit | 346/75 |

FOREIGN PATENT DOCUMENTS 50-33927 10/1975 Japan .

59-44998 11/1984 Japan .

OTHER PUBLICATIONS

W. L. Dollenmayer, "Ink Jet Nozzle Design", IBM Tech Journal, vol. 22, No. 6, Nov. 1979.

*Primary Examiner*—Benjamin R. Fuller
*Assistant Examiner*—Alrick Bobb
*Attorney, Agent, or Firm*—Blakely, Sokoloff, Taylor & Zafman

[57] ABSTRACT

A head for an image printing apparatus includes a housing, an air nozzle, an ink nozzle, a valve seat, a diaphragm, and an actuator. The housing has a cylindrical body with a bottom to cause a nozzle head to oppose a printing surface at a predetermined interval. The air nozzle is connected to an air path formed at a central portion of a front end face of the nozzle head. The ink nozzle is formed coaxial with the air nozzle, connected to an external pressurized ink tank, and formed in the nozzle head. The valve seat is formed in a rear opening end of the ink nozzle. The diaphragm is in tight contact with the valve seat and has a peripheral portion supported by the nozzle head. The actuator is supported by a support member in the housing and its operation end is fixed on a central portion of a surface of the diaphragm.

6 Claims, 2 Drawing Sheets

HEAD FOR IMAGE PRINTING APPARATUS

BACKGROUND OF THE INVENTION

The present invention relates to a head for injecting an ink as a pixel to a printing surface to form an image in an image printing apparatus for expressing gradation of a pixel as a minimum unit constituting an image in accordance with a change in recording area or printing density.

A printing image is constituted by a set of pixels as the minimum units of the image. An image printing apparatus capable of recording an image on the basis of image information of each pixel has been developed. In an image printing apparatus of this type, gradation of each pixel is expressed by changing a printing area of pixels or their printing density.

A conventional image printing apparatus of this type comprises an actuator controller arranged near an original image surface and a spray gun serving as a head electrically connected to the actuator controller through a solenoid valve. The spray gun is operated while the original image and paper are synchronously moved. An ink in an ink tank is guided through a flow path and sprayed from a nozzle to a paper surface by a siphon effect generated by an air pressure whose flow rate is controlled by the solenoid valve. At this time, the actuator controller outputs image information in units of pixels of the original image and ON/OFF-controls the solenoid valve. The ink is intermittently sprayed from the spray gun, and an image having gradation corresponding to the image information of the original image is printed on the printing surface.

Since the head in the conventional image printing apparatus comprises a siphon type spray gun having the solenoid valve, as described above, the apparatus as a whole including the valve body becomes heavy and is difficult to handle. In addition, since this apparatus employs the valve structure, response is poor. Since an amount of ink is controlled by air as a compressed fluid, the response time is further prolonged, and reproducibility of image information is degraded. Adjustment and maintenance operations are cumbersome and time-consuming, and much labor and skills are required due to the above reasons.

SUMMARY OF THE INVENTION

It is an object of the present invention to provide a nozzle for an image printing apparatus, capable of obtaining a clear image, improving printed matters, and achieving high response and excellent reproducibility of an image.

It is another object of the present invention to provide a lightweight, compact nozzle for an image printing apparatus, which can be easily maintained and adjusted and can improve durability due to reduction in wear and fatigue.

It is still another object of the present invention to provide a nozzle for an image printing apparatus, which can greatly improve performance of the printing apparatus due to constant supply of the ink.

In order to achieve the above objects of the present invention, there is provided a head for an image printing apparatus, comprising; a housing, having a cylindrical body with a bottom, for causing a nozzle head to oppose a printing surface at a predetermined interval, an air nozzle connected to an air path formed at a central portion of a front end face of the nozzle head, an ink nozzle formed coaxial with the air nozzle, connected to an external pressurized ink tank, and formed in the nozzle head, a valve body formed in a rear opening end of the ink nozzle, a diaphragm which is in tight contact with the valve seat and a peripheral portion of which is supported by the nozzle head, and an actuator which is supported by a support member in the housing and an operation end of which is fixed on a central portion of a flat surface of the diaphragm.

When the air source is operated, an ink sprayed from the ink nozzle is surrounded by the air sprayed from the air nozzle and travels straight with a controlled dispersion distribution. At this time, image information of each pixel of an original image is output from the actuator controller to ON/OFF-control the actuator. The actuator moves the diaphragm back and forth to close and open the valve seat. The ink is intermittently sprayed from the ink nozzle, and an image having gradation corresponding to the image information of the original image is printed on the printing surface.

DESCRIPTION OF THE PREFERRED EMBODIMENTS

Figure 1:
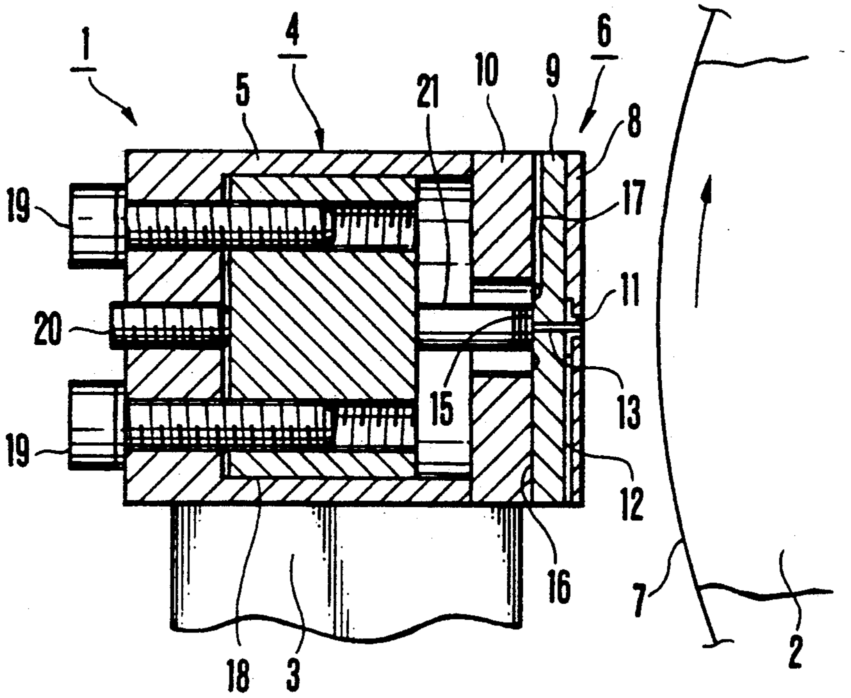
FIG. 1 is a longitudinal sectional view of a head for an image forming apparatus according to an embodiment of the present invention.
Figure 2:
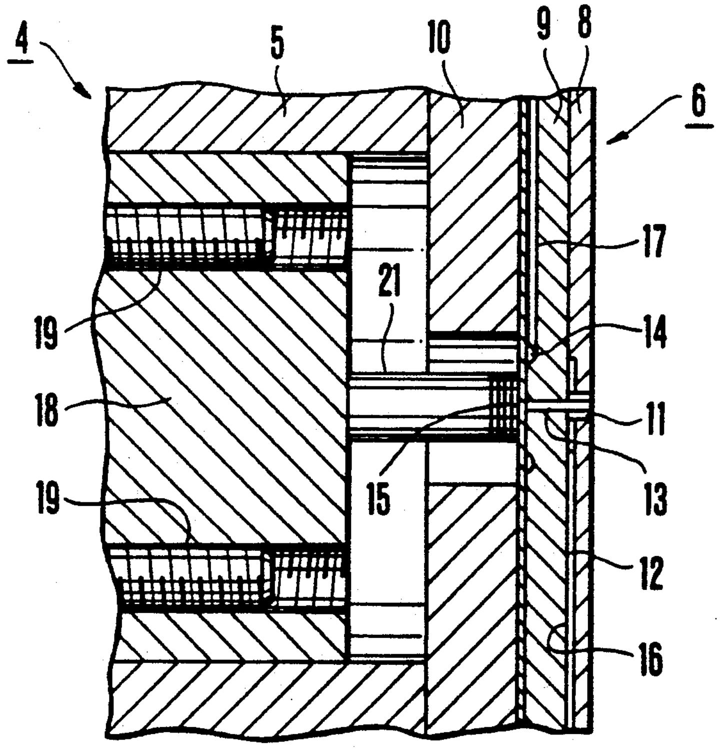
FIG. 2 is an enlarged longitudinal sectional view showing the main part of the image forming apparatus shown in FIG. 1.

FIGS. 1 and 2 show a head for an image printing apparatus according to an embodiment of the present invention.

Referring to FIGS. 1 and 2, a head 1 comprises a housing 4 located near a circumferential surface of a rotary cylinder 2 and supported by a support member 3. The support member 3 is reciprocated in the axial direction of the rotary cylinder 2 so as to be interlocked with rotation of the rotary cylinder 2. The housing 4 has a cylindrical shape having two closed ends and comprises a cylindrical body (hollow body) 5 having a bottom and a rectangular section, and a nozzle head 6 serving as a front bottom plate which closes an open end of the cylindrical body 5. The nozzle head 6 opposes to be spaced apart from a printing surface of, e.g., paper 7 mounted on the rotary cylinder 2 by a predetermined distance. The nozzle head 6 is formed by bonding front, middle, and rear plates 8, 9, and 10 which are divided in a direction of thickness. An air nozzle 11 is formed at the central portion of the front plate 8 such that the open end on the middle plate 9 side has a disc-like opening. The air nozzle 11 is connected to an external air source (not shown) through an air path 12 open to the disc-like opening end and defined between the front and middle plates 8 and 9. An ink nozzle 13 coaxial with the air nozzle 11 is formed at the central portion of the middle plate 9. A circular valve seat 15 surrounded by an annular ink reservoir 14 is formed at an open end of the rear portion of the ink nozzle 13. Reference numeral 16 denotes a circular diaphragm made of an elastic thin metal plate. The central portion of the diaphragm 16 is normally in tight contact with the valve seat 15, and the peripheral portion of the diaphragm 16 is supported and clamped between the middle and the rear plates 9 and 10. The ink nozzle 13 is connected to an external pressurized ink tank (not shown) through an ink path 17 formed between the valve seat 15 and the diaphragm 16 and between the diaphragm 16 and the middle plate 9. The ink in the ink tank is pressurized and is supplied to the valve seat 15 through the ink path 17. The ink is then supplied to the ink nozzle 13 through a gap between the valve seat 15 and the diaphragm 16 which can be opened by an actuator 21 (to be described in detail later). A support member 18 is slidably fitted in the hollow portion of the housing 4. Bolts 19 are threadably fitted in the screw holes in the support member 18 through the wall portions of the housing 4, so that the support member 18 can be moved back and forth upon rotation of the bolts 19. Reference numeral 20 denotes a bolt which is threadably engaged with a screw hole formed in the housing 4 to fix the support member 18 after adjustment. The actuator or piezoelectric element 21, an operation end of which is integrally fixed with the central portion of the flat surface of the diaphragm 16, is mounted on the central portion of the support member 18 at its end face on the nozzle head 6. The piezoelectric element 21 is connected to the actuator controller. A drive signal corresponding to pixel information of an original image is input to the piezoelectric element 21 and is ON/OFF-controlled, the diaphragm 16 is moved back and forth to close and open the valve seat 15. The reciprocal movement of the piezoelectric element 21 is adjusted by the bolts 19 through the support member 18 to adjust a gap between the diaphragm 16 and the valve body 15.

An operation of the head having the above arrangement will be described below. When compressed air is supplied from the air source for the head 1 to the nozzle head 6, this air is supplied to the air nozzle 11 through the air path 12 and is sprayed from the air nozzle 11. When the pressurized ink is supplied from the ink tank to the nozzle head 6, the ink is supplied to the valve seat 15 through the ink path 17 and the ink reservoir 14 and is sprayed from the ink nozzle 13 through a gap between the valve seat 15 and the diaphragm 16. The sprayed ink is surrounded by the air flow formed by the air sprayed from the air nozzle 11 and travels straight with a controlled dispersion distribution. The ink is then printed as a clear pixel on the printing surface of the paper 7. At this time, since the drive signal which is ON/OFF-controlled by image information of an original image is input to the piezoelectric element 21, the piezoelectric element 21 is ON/OFF-controlled to reciprocate the diaphragm 16 and hence open/close the valve seat 15. As a result, the ink passes through the valve seat 15 while the valve seat 15 is open. Therefore, an image having gradation corresponding to the image information of the original image can be printed on the printing surface of the paper 7.

In order to change an amount of ink passing through the valve seat 15, the bolt 20 is loosened to move the piezoelectric element 21 backward together with the support member 18. The open end limit of the diaphragm 16 is changed to adjust a degree of opening of the valve seat 15. The amount of ink passing through the valve seat 15 is adjusted, and the adjusted amount of ink can be kept constant after the adjustment. In addition, when a voltage applied to the piezoelectric element 21 is changed, zero adjustment and opening adjustment of the valve seat 15 can be performed.

In the head operated as described above, since a movable member is the diaphragm 16 made of a thin film, the operation of the actuator can be accurately transmitted. For example, the actuator comprises the piezoelectric element 21, as described in this embodiment, high response can be obtained, and pixels having excellent reproducibility can be formed. Since the ON/OFF drive signals are input to the piezoelectric element 21, an amount of ink applied to the unit printing area can be changed in accordance with a change in duty ratio of the signal, thus facilitating gradation expressions.

Figure 3:
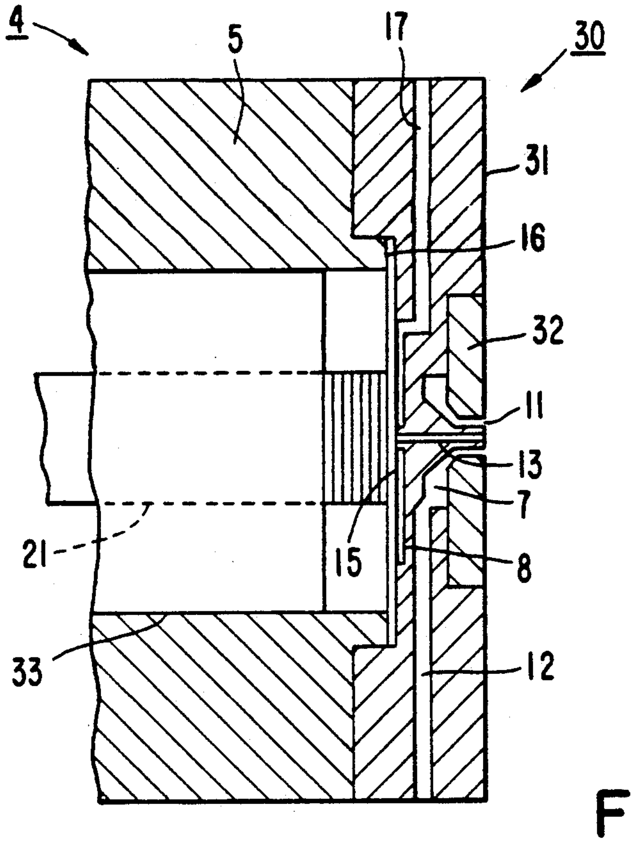
FIG. 3 is an enlarged longitudinal sectional view showing a head part in correspondence with FIG. 2 according to another embodiment of the present invention.
Figure 4:
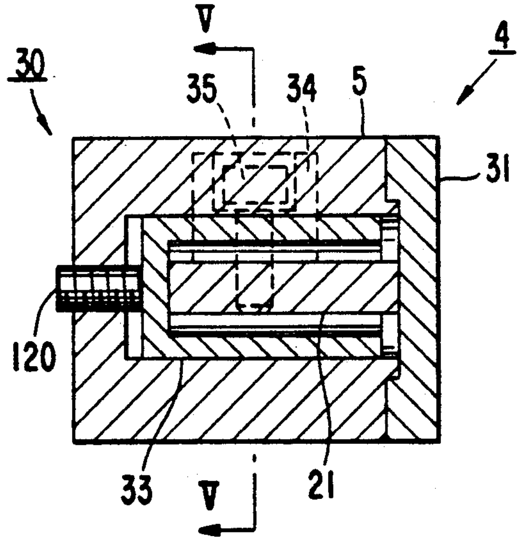
FIG. 4 is a sectional view showing the overall structure of the head.
Figure 5:
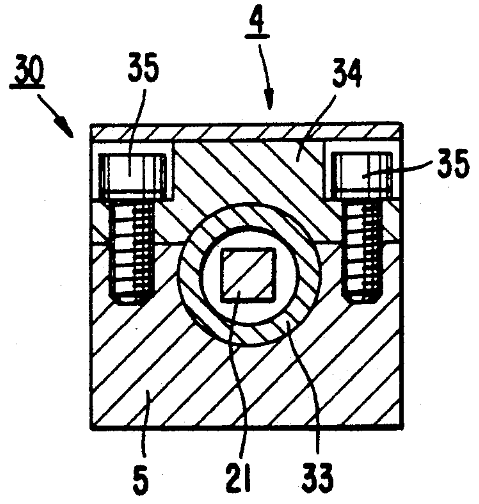
FIG. 5 is a sectional view of the head along the line V—V of FIG. 4.

FIGS. 3 to 5 show another embodiment of the present invention. FIG. 3 shows a main part of a head in correspondence with FIG. 2, FIG. 4 is a sectional view thereof, and FIG. 5 is a sectional view thereof along the line V—V in FIG. 4.

A housing 4 of a head 30 of this embodiment comprises a cylindrical body 5 having a bottom. A disc-like cap 32 having an air nozzle 11 at its central portion is fitted in a recess of a disc-like flange 31 fixed at the distal end of the housing 5. An air path 12, an ink path 17, and an ink nozzle 13 fitted in the air nozzle 11 are formed in the flange 31. A valve seat 15 and a diaphragm 16 are arranged behind the ink nozzle 13. Reference numeral 7 denotes an air reservoir; and 8, an ink reservoir. A piezoelectric element 21 is housed in a cylindrical case 33, and the cylindrical case 33 is fitted in the hollow portion of the body 5. The case 33 is fixed by a holder 34 fitted in a groove in the body 5 and bolts 35. Reference numeral 20 denotes a bolt for fixing the case 33.

An operation of the head 30 having the above arrangement is the same as that of the previous embodiment, and a detailed description thereof will be omitted.

In each embodiment described above, the actuator comprises the piezoelectric element 21, but is not limited to this.

In a head for an image forming apparatus according to the present invention, as has been described above, a housing supported by a support member comprises a cylindrical member having a bottom, an air nozzle and an ink nozzle coaxial with the air nozzle are formed at a central portion of the nozzle head in the housing. The air nozzle and the ink nozzle are connected to an air source and a pressurized ink tank, respectively. The peripheral portion of a diaphragm which is in tight contact with a valve seat formed at the opening end of the rear portion of the ink nozzle is supported by the nozzle head. An actuator, an operation end of which is in contact with the central portion of the flat surface of the diaphragm, is supported by a support member which can be reciprocated in the housing. Since the ink sprayed from the ink nozzle is surrounded by air sprayed from the air nozzle and travels straight with a controlled dispersion distribution, a clear image can be obtained, and the quality of the printed matters can be improved. In addition, the valve seat is opened and closed upon ON/OFF operations of the actuator to control the densities of the pixels by the ON durations of the drive signals, so that high response can be obtained, and pixels having excellent reproducibility can be obtained. Since the movable portion is formed of a diaphragm of a thin film, an operation of the actuator can be accurately transmitted, and a higher response can be obtained. At the same time, a lightweight, compact apparatus can be obtained, and maintenance and adjustment can be facilitated. Since the stroke of the diaphragm is very short, wear and fatigue of the diaphragm can be minimized to improve durability. The flow rate of the ink can be adjusted by a simple operation and the adjusted amount of ink can be maintained constant after adjustment, thereby greatly improving the performance of the apparatus.

What is claimed is:

1. A head for an image printing apparatus, comprising:

a housing, having a hollow body with a bottom, for causing a nozzle head to oppose a printing surface at a predetermined interval, said nozzle head being formed by bonding front, middle, and rear plates divided in a direction of thickness;

an air nozzle connected to an air path formed at a central portion of a front end face of said nozzle head such that an open end on said middle plate side has a disc-like opening, said air path being open to said disc-like opening end and defined between said front and middle plates;

an ink nozzle formed coaxial with said air nozzle, connected to an external pressurized ink tank, and formed in said nozzle head at a central portion of said middle plate;

a valve seat formed in a rear opening end of said ink nozzle;

a diaphragm comprising a valve for opening and closing said valve seat, wherein said diaphragm is in tight contact with said valve seat and a peripheral portion of said diaphragm remote from said valve seat is supported by said housing, and wherein said valve has a diameter larger than a diameter of said valve seat; and an actuator which is supported by a support member in said housing and an operation end of which is fixed on a central portion of a surface of said diaphragm.

2. A head according to claim 1, further comprising: actuator adjusting means for adjusting the predetermined interval between said valve seat and said diaphragm; and actuator fixing means for fixing said actuator.

3. A head according to claim 2 wherein said actuator adjusting means and said actuator fixing means comprise screws.

4. A head according to claim 1 further comprising an ink path defined between said diaphragm and said middle plate for connecting said ink tank to said ink nozzle.

5. A head according to claim 4, wherein said nozzle head comprises a cap having said air nozzle formed therein, and a disc-like flange having said air path and said ink path.

6. A head according to claim 1, wherein said actuator comprises a piezoelectric element.

* * * * *